United States Patent
James

(10) Patent No.: US 7,204,507 B1
(45) Date of Patent: Apr. 17, 2007

(54) BALL HITCH COVERING

(76) Inventor: Bernell E. James, 114 NE. 205 Ter., Miami, FL (US) 33179

( * ) Notice: Subject to any disclaimer, the term of this patent is extended or adjusted under 35 U.S.C. 154(b) by 109 days.

(21) Appl. No.: 11/178,125

(22) Filed: Jul. 11, 2005

Related U.S. Application Data

(63) Continuation-in-part of application No. 10/899,402, filed on Jul. 27, 2004.

(51) Int. Cl.
*B60R 21/34* (2006.01)
(52) U.S. Cl. .................. 280/507; 150/166; 40/591
(58) Field of Classification Search ............... 280/507; 150/166; 40/591
See application file for complete search history.

(56) References Cited

U.S. PATENT DOCUMENTS

| 3,228,445 | A | | 1/1966 | Mayotte | |
| 3,255,794 | A | * | 6/1966 | Morse | 150/160 |
| 3,596,926 | A | * | 8/1971 | Randall | 280/507 |
| 3,679,234 | A | | 7/1972 | Colliau | |
| 4,181,320 | A | | 1/1980 | Wellborn, Jr. | |
| 4,239,271 | A | * | 12/1980 | Beasley et al. | 294/74 |
| 4,738,293 | A | | 4/1988 | Ostrom et al. | |
| 4,955,968 | A | * | 9/1990 | Beckerer, Jr. | 280/507 |
| 5,037,122 | A | * | 8/1991 | Beckerer, Jr. | 280/507 |
| 5,658,004 | A | * | 8/1997 | Flanik | 280/507 |
| D399,802 | S | | 10/1998 | Adelaar | |
| 6,102,424 | A | | 8/2000 | Cole, Jr. et al. | |
| 6,412,806 | B1 | * | 7/2002 | Peacock | 280/507 |
| D496,888 | S | * | 10/2004 | Johnson, Jr. | D12/162 |
| 6,857,652 | B2 | * | 2/2005 | Dougherty | 280/507 |

* cited by examiner

*Primary Examiner*—Kevin Hurley

(57) ABSTRACT

A ball hitch covering for protecting a ball hitch from the elements includes a cover that has a top wall and a peripheral wall that is attached to and extends downwardly from the top wall. The peripheral wall has a bottom edge defining an opening into an interior of the cover. A ball hitch may be removably extended through the opening. A flap has an upper edge, a lower edge and a pair of lateral edges. The upper edge is attached to an outer surface of the peripheral wall. The flap extends below the bottom edge of the peripheral wall. Indicia are positioned on a forward surface of the flap that faces away from the cover.

10 Claims, 3 Drawing Sheets

BALL HITCH COVERING

This application is a continuation in part of application Ser. No. 10/899,402 filed on Jul. 27, 2004.

BACKGROUND OF THE INVENTION

1. Field of the Invention

The present invention relates to hitch cover devices and more particularly pertains to a new hitch cover device for covering and protecting a ball hitch.

2. Description of the Prior Art

The use of hitch cover devices is known in the prior art. U.S. Pat. No. 4,181,320 describes a ball hitch cover that includes a plurality of resilient fingers for engaging a neck of the ball hitch. Another type of hitch cover device is U.S. Pat. No. 4,738,293 having a decorative head portion that may be removably attached to a main covering, which is positioned on a ball hitch. Yet another such device is U.S. Pat. No. 3,679,234 which includes a molded form that encases the ball hitch.

While these devices fulfill their respective, particular objectives and requirements, the need remains for a device which is easy to position on and remove from a ball hitch. In addition to efficiency of use, the device should also be effective in preventing water from coming in contact with the ball hitch to ensure that the ball hitch does not corrode due to prolonged or multiple contacts with water.

SUMMARY OF THE INVENTION

The present invention meets the needs presented above by generally including a cover that has a top wall and a peripheral wall that is attached to and extends downwardly from the top wall. The peripheral wall has a bottom edge defining an opening into an interior of the cover. A ball hitch may be removably extended through the opening. A flap has an upper edge, a lower edge and a pair of lateral edges. The upper edge is attached to an outer surface of the peripheral wall. The flap extends below the bottom edge of the peripheral wall. Indicia are positioned on a forward surface of the flap that faces away from the cover.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
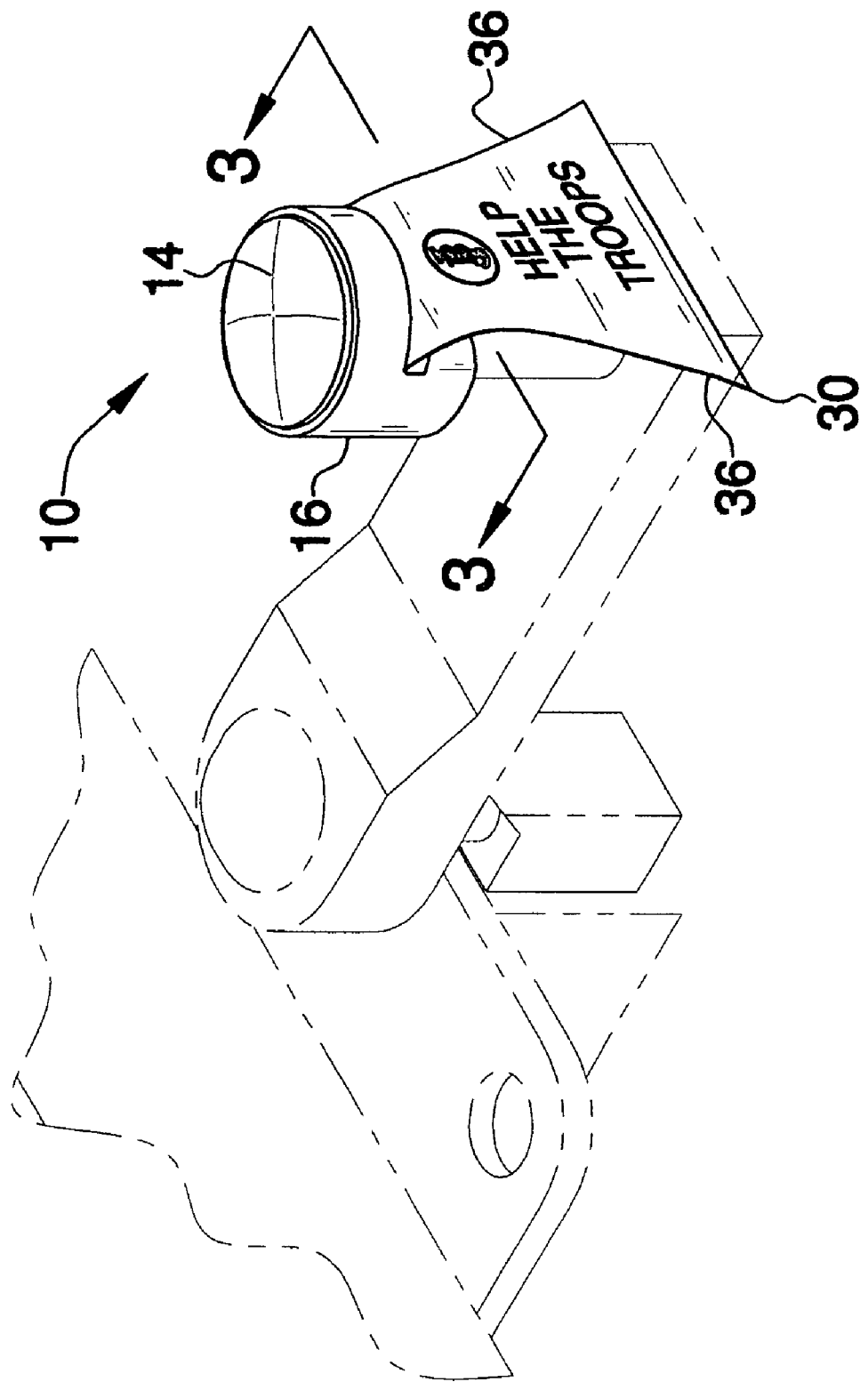
FIG. 1 is a front perspective view of a ball hitch covering according to the present invention.
Figure 2:
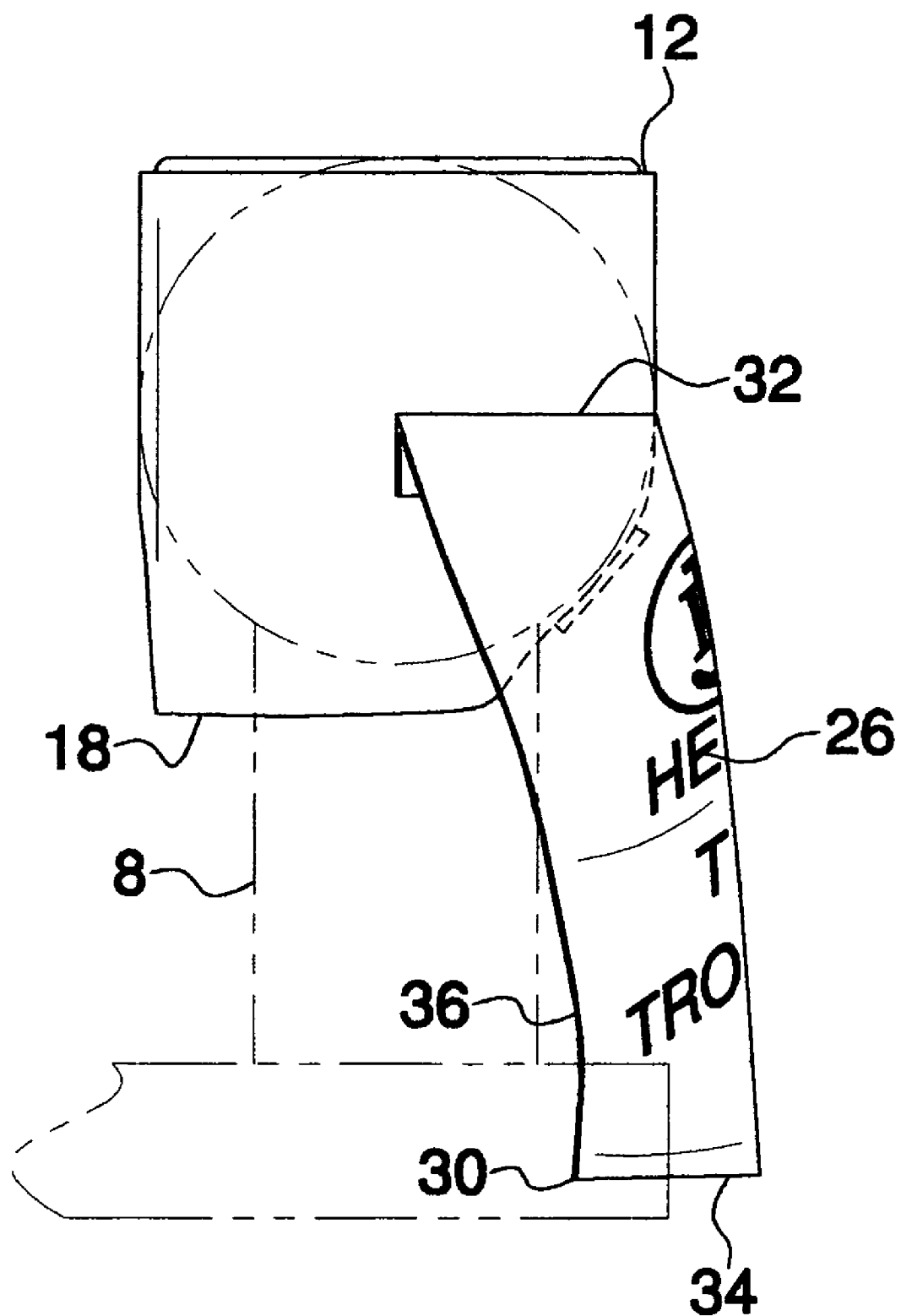
FIG. 2 is a side view of the present invention.
Figure 3:
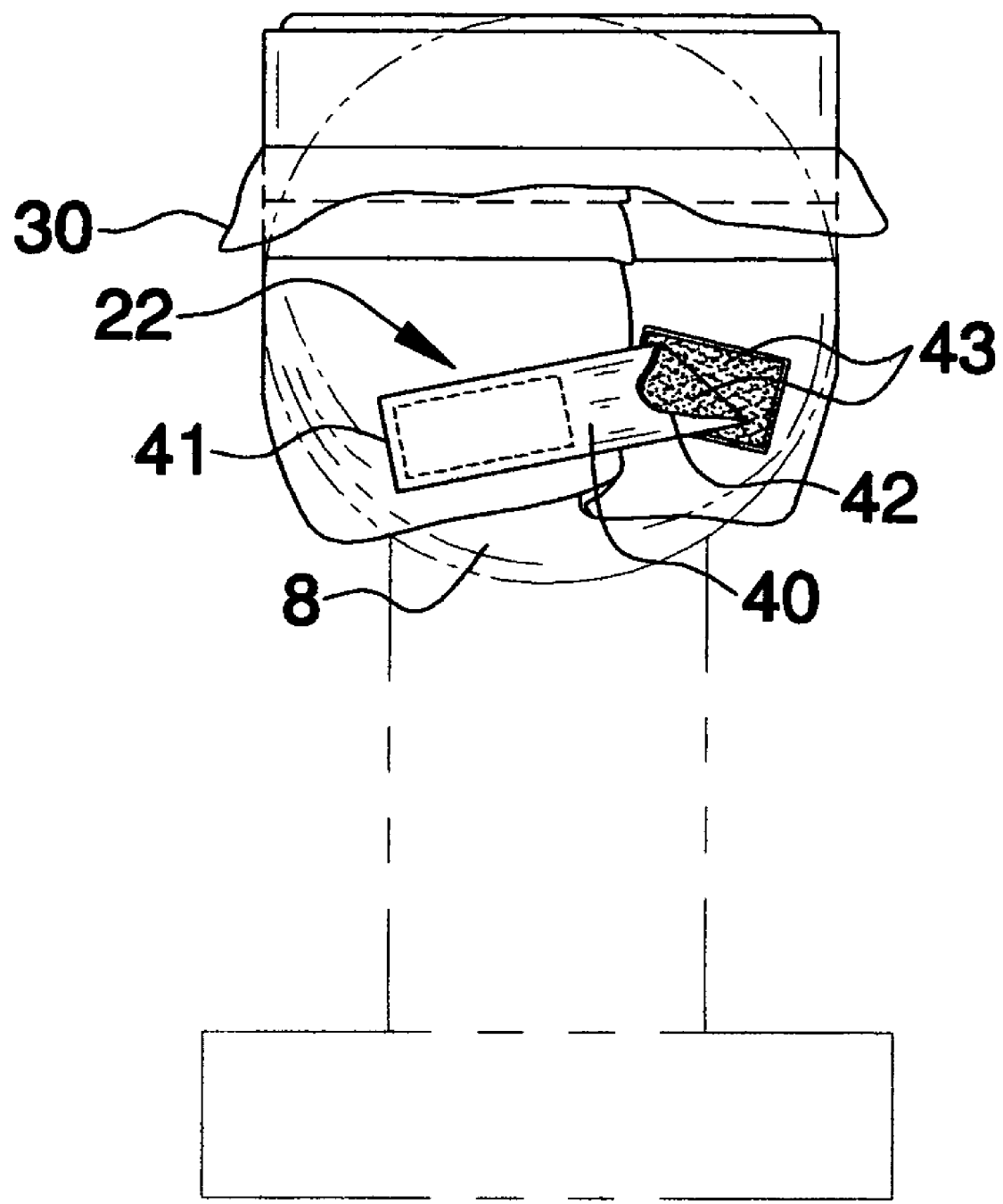
FIG. 3 is front view taken along line 3—3 of FIG. 1 of the present invention.

With reference now to the drawings, and in particular to FIGS. 1 through 3 thereof, a new hitch cover device embodying the principles and concepts of the present invention and generally designated by the reference numeral 10 will be described.

As best illustrated in FIGS. 1 through 3, the ball hitch covering 10 generally comprises a cover 12 that has a top wall 14 and a peripheral wall 16 that is attached to and extends downwardly from the top wall 14. The peripheral wall 16 has a bottom edge 18 that defines an opening 20 into an interior of the cover 12. A ball hitch 8 may be removably extended through the opening 20. The top wall 14 may be preferably domed shaped. The cover 12 has a height generally between 3 inches and 7 inches. The cover 12 preferably comprises a substantially waterproof material and may include an elastomeric material, a flexible plastic material or a leather material.

A securing member 22 is positioned on the cover 12 and is configured to releasably secure the cover 12 to a ball hitch 8. The securing member 22 comprises a flexible panel 40 that has a first end 41 and a second end 42. The first end 41 is attached to the peripheral wall 14 adjacent to the bottom edge 18 and a coupler 43 releasably secures the second end 42 to the peripheral wall 16 at a position adjacent to the bottom edge 18 and selectively spaced from the first end 41. This allows the peripheral wall 14 to be cinched around the ball hitch 8 as shown in FIG. 3. The coupler 43 preferably comprises a hook and loop coupler.

A cloth material may be attached to and substantially cover an inner surface of the cover 12. The cloth material is preferably a cotton material, though synthetic fibers may also be utilized.

A flap 30 has an upper edge 32, a lower edge 34 and a pair of lateral edges 36. The upper edge 32 is attached to an outer surface of the peripheral wall 16. The upper edge 32 is positioned between the top wall 14 and the securing member 22. The flap 30 extends below the bottom edge 18 of the peripheral wall 16. The flap 30 extends at least 2 inches below the bottom edge 18.

Indicia 26, such as logos or phrases, are positioned on a forward surface of the flap 30 and faces away from said cover 12. The cover 12 would preferably colored a color that would be representative of the indicia if the indicia 26 comprise a logo.

In use, the ball hitch 8 is extended through the opening 20 so that the cover 12 substantially covers the ball hitch 8. The cover 12 protects the ball hitch 8 from the elements. The securing member 22 engages a neck of the ball hitch 8 and prevents liquid from getting between the cover 12 and the ball hitch 8. The securing member 22 also keeps the cover 12 on the ball hitch 8.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch ball covering and display combination device adapted for being removably positioned on a hitch ball, said device comprising:
   a cover having a top wall and a peripheral wall being attached to and extending downwardly from said top wall, said peripheral wall having a bottom edge defining an opening into an interior of said cover, wherein the ball hitch may be removably extended through said opening;
   a flap having an upper edge, a lower edge and a pair of lateral edges, said upper edge being attached to an outer surface of said peripheral wall, said flap extending below said bottom edge of said peripheral wall; and
   indicia being positioned on a forward surface of said flap and facing away from said cover.

2. The device according to claim 1, wherein said cover has a height generally between 3 inches and 7 inches.

3. The device according to claim 1, wherein said cover comprises a substantially waterproof material.

4. The device according to claim 1, further including a securing member being positioned on said cover and configured to releasably securing said cover to the ball hitch.

5. The device according to claim 4, wherein said securing member comprises a flexible panel having a first end and a second end, said first end being attached to said peripheral wall adjacent to said bottom edge, a coupler releasably securing said second end to said peripheral wall at a position adjacent to said bottom edge and selectively spaced from said first end.

6. The device according to claim 5, wherein said coupler comprises a hook and loop coupler.

7. The device according to claim 4, wherein said upper edge of said flap is positioned between said top wall and said securing member, said flap extending below said bottom edge of said peripheral wall.

8. The device according to claim 7, wherein said flap extends at least 2 inches below said bottom edge.

9. The device according to claim 1, wherein said flap extends at least 2 inches below said bottom edge.

10. A hitch ball covering and display combination device adapted for being removably positioned on a hitch ball, said device comprising:
    a cover having a top wall and a peripheral wall being attached to and extending downwardly from said top wall, said peripheral wall having a bottom edge defining an opening into an interior of said cover, wherein the ball hitch may be removably extended through said opening, said top wall having a domed shape, said cover having a height generally between 3 inches and 7 inches, said cover comprising a substantially waterproof material;
    a securing member being positioned on said cover and configured to releasably securing said cover to the ball hitch, said securing member comprising a flexible panel having a first end and a second end, said first end being attached to said peripheral wall adjacent to said bottom edge, a coupler releasably securing said second end to said peripheral wall at a position adjacent to said bottom edge and selectively spaced from said first end, said coupler comprising a hook and loop coupler;
    a flap having an upper edge, a lower edge and a pair of lateral edges, said upper edge being attached to an outer surface of said peripheral wall, said upper edge being positioned between said top wall and said securing member, said flap extending below said bottom edge of said peripheral wall, said flap extending at least 2 inches below said bottom edge; and
    indicia being positioned on a forward surface of said flap and facing away from said cover.

* * * * *